United States Patent
Pan et al.

(10) Patent No.: US 11,821,317 B1
(45) Date of Patent: Nov. 21, 2023

(54) COAL OR ROCK DYNAMIC DISASTER WARNING APPARATUS AND METHOD

(71) Applicant: LIAONING UNIVERSITY, Shenyang (CN)

(72) Inventors: Yishan Pan, Shenyang (CN); Hongrui Zhao, Shenyang (CN); Kuiyong Liu, Shenyang (CN); Hao Luo, Shenyang (CN); Wei Wang, Shenyang (CN); Yonghui Xiao, Shenyang (CN)

(73) Assignee: LIAONING UNIVERSITY, Shenyang (CN)

( * ) Notice: Subject to any disclaimer, the term of this patent is extended or adjusted under 35 U.S.C. 154(b) by 0 days.

(21) Appl. No.: 18/120,626

(22) Filed: Mar. 13, 2023

(30) Foreign Application Priority Data

Dec. 5, 2022 (CN) .......................... 202211549380.5

(51) Int. Cl.
*E21F 17/18* (2006.01)
*E21C 41/16* (2006.01)

(52) U.S. Cl.
CPC .............. *E21F 17/18* (2013.01); *E21C 41/16* (2013.01)

(58) Field of Classification Search
CPC ................................ E21F 17/18; E21C 41/16
See application file for complete search history.

(56) References Cited

U.S. PATENT DOCUMENTS

| | | | |
|---|---|---|---|
| 6,490,527 B1 * | 12/2002 | Utt | G01V 9/00 702/9 |
| 6,571,886 B1 * | 6/2003 | Sullivan | E21B 44/005 73/53.05 |
| 2007/0251326 A1 * | 11/2007 | Mathis | G01D 5/16 73/760 |

FOREIGN PATENT DOCUMENTS

CN 203204791 U * 9/2013

OTHER PUBLICATIONS

Wang, G., Pan, Y., Xiao, X., Wu, D., Zhao, H., Wang, A., & Ding, X. (2019). Study on the relationship between stress and charge of coal mass under uniaxial compression. Shock and Vibration, Published Oct. 21, 2019, 1-13. Luca Landi. https://doi.org/10.1155/2019/9412697.

* cited by examiner

*Primary Examiner* — Tarun Sinha
(74) *Attorney, Agent, or Firm* — Maine Cernota & Curran

(57) ABSTRACT

An apparatus for improving the safety and efficiency of underground mining by issuing intelligent warnings of impending coal or rock dynamic disasters includes at least one coal or rock charge probe adaptable to a coal or rock face and configured to detect charge data generated by coal or rock cracking during a mining process, and a monitoring host electrically connected to the coal or rock charge probe and configured to receive the charge data and issue a warning of an impending coal or rock dynamic disaster when warranted by the charge data. In embodiments, the apparatus includes a plurality of channels, and is non-contacting and/or portable.

17 Claims, 3 Drawing Sheets

COAL OR ROCK DYNAMIC DISASTER WARNING APPARATUS AND METHOD

RELATED APPLICATIONS

This application claims the priority of Chinese Application No. 202211549380.5, filed on Dec. 5, 2022, entitled "COAL OR ROCK DYNAMIC DISASTER WARNING APPARATUS AND METHOD", which is incorporated herein in its entirety for all purposes.

FIELD OF THE INVENTION

The invention relates to underground mining safety, and more particularly, to apparatus and methods for warning mine personnel of impending coal or rock dynamic disasters.

BACKGROUND OF THE INVENTION

As the depths of underground mines such as coal mines increases, coal or rock dynamic disasters occur more and more frequently, and the occurrence intensity and the degree of destruction also exhibit a gradually rising trend. Therefore, the ability to accurately warn coal or rock dynamic disasters is of critical importance for the safe and efficient production of coal mines.

Currently, there are multiple warning methods for coal or rock dynamic disasters, which are mainly separated into two categories.

The first category involves prediction methods for a number of conventional indexes including cuttings quantity, borehole gas outflow initial velocity, and the like. These conventional indexes are able to reflect to some extent the abnormal phenomena of the gas during coal mining, but are disadvantageous in that time and labor are wasted usually, and the accuracy of predicted results is often not high, affecting the efficient and high production of the coal mines.

The second category involves geophysical monitoring methods that are developed and are increasingly under the attention of researchers on the basis of the methods in the first category described above. The common geophysical monitoring methods are acoustic emission monitoring, electromagnetic radiation, microseismic methods, and the like. However, these monitoring methods mostly suffer from the disadvantages of being vulnerable to disturbances, poor in location accuracy, and high in investment, and having great impacts of mining ranges on the layout.

What is urgently needed, therefore, is a new coal or rock dynamic disaster warning solution that can better ensure safe and efficient operation of underground mines such as coal mines.

SUMMARY OF THE INVENTION

An objective of embodiments of the present invention is to provide a coal or rock dynamic disaster warning apparatus and method for at least partially solving the above technical problems.

In order to achieve the above objective, an embodiment of the present invention provides a coal or rock dynamic disaster warning apparatus, including: at least one coal or rock charge probe adapting to be arranged at a coal face, and used for detecting charge data generated by coal or rock cracking in a coal mining process; and a monitoring host electrically connected to the coal or rock charge probe and used for acquiring the charge data and warning coal or rock dynamic disasters according to the charge data.

Optionally, the quantity of the coal or rock charge probe is one, and the monitoring host used for warning coal or rock dynamic disasters according to the charge data includes: acquiring charge data detected in real time by the coal or rock charge probe, and indicating that a coal or rock dynamic disaster at a first risk level exists if an amplitude of the charge data exceeds a set amplitude; acquiring charge data detected by the coal or rock charge probe during a predetermined time period, and indicating that a coal or rock dynamic disaster at a second risk level exist if a frequency that an amplitude of the charge data exceeds the set amplitude during the predetermined time period is greater than a set frequency; and/or acquiring charge data detected by the coal or rock charge probe during an adjacent specified period, indicating that the coal or rock dynamic disaster at the first risk level exists if an amplitude of the charge data during a subsequent period is greater than a predetermined proportion compared with an amplitude of the charge data during a previous period. The second risk level is higher than the first risk level.

Optionally, the quantity of the coal or rock charge probe is at least two, and the monitoring host used for warning coal or rock dynamic disasters according to the charge data includes: acquiring charge data detected in real time by the at least two coal or rock charge probes; indicating that the coal or rock dynamic disaster at a first risk level exists if an amplitude of the charge data for any one of the coal or rock charge probes exceeds the set amplitude; indicating that the coal or rock dynamic disaster at a second risk level exists if the amplitudes of all the acquired charge data exceed the set amplitude; and determining a location of a damage source at which the coal or rock dynamic disaster occurs according to all the acquired charge data. The second risk level is higher than the first risk level.

Optionally, the coal or rock charge probe includes: a housing; an induction plate disposed at one outer end of the housing and used for inducing charge data generated in a coal or rock cracking process; a circuit board disposed inside the housing, electrically connected to the induction plate and the monitoring host, and used for performing signal processing on charge data induced by the induction plate and transmitting the charge data subjected to signal processing to the monitoring host; and an insulation plug disposed between the induction plate and the housing, being in threaded connection with the housing, and used for establishing electrical insulation between the induction plate and the housing.

Optionally, the induction plate is a white steel induction plate or a pure copper induction plate, and/or the circuit board is a white steel circuit board.

Optionally, the circuit board is integrated with a filtering unit for filtering the charge data induced by the induction plate.

Optionally, the monitoring host includes: an acquisition board electrically connected to the coal or rock charge probe and used for acquiring the charge data; a display screen used for acquiring the charge data from the acquisition board and displaying the charge data; and a battery used for supplying power to the acquisition board and the display screen, and supplying power to the coal or rock charge probe by the acquisition board.

Optionally, the monitoring host further includes channel interfaces arranged for the coal or rock charge probe, wherein one channel interface corresponds to one coal or rock charge probe and is used for electrically connecting the corresponding coal or rock charge probe to the acquisition board.

In another aspect, the present invention provides a coal or rock dynamic disaster warning method employing the above any coal or rock dynamic disaster warning apparatus, and including: arranging the coal or rock charge probe adapting to the coal face, and fixing the monitoring host adapting to the location of the coal or rock charge probe; and acquiring, by the monitoring host, charge data detected by the coal or rock charge probe, and warning a coal or rock dynamic disaster according to the charge data.

Optionally, arranging the coal or rock charge probe adapting to the coal face includes: arranging a borehole for placement of the coal or rock charge probe at one or more locations inside an intake airway and/or a return airway of the coal face and within a specified distance range from the coal face, wherein one coal or rock charge probe is placed inside one corresponding borehole.

By the above technical solution, embodiments of the present invention provide the multi-channel, non-manual contact and portable coal or rock dynamic disaster warning apparatus, which achieves safe, efficient and intelligent coal or rock dynamic disaster warning.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The drawings are used to provide a further understanding of embodiments of the present invention and constitute a part of the specification, and serve to explain, but not to limit, the embodiments of the present invention together with specific embodiments below. In the drawings.

Figure 1:
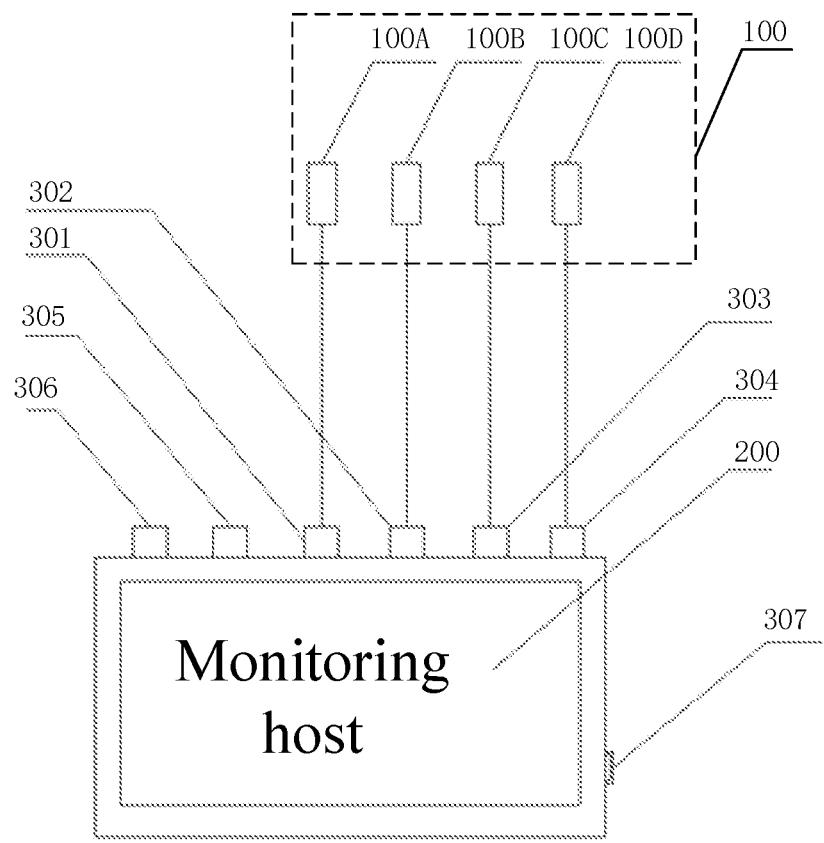
FIG. 1 is a structural schematic diagram of a coal or rock dynamic disaster warning apparatus according to an embodiment of the present invention.

DESCRIPTION OF REFERENCE NUMERALS 100. coal or rock charge probe;
200. monitoring host.
100A. first coal or rock charge probe;
100B. second coal or rock charge probe;
100C. third coal or rock charge probe;
100D. fourth coal or rock charge probe.
101. housing;
102. Induction plate;
103. circuit board;
104. insulation plug;
105. circuit connection line;
106. line exit bellmouth;
107. output cable.
201. acquisition board;
202. display screen;
203. battery.
301. first channel interface;
302. second channel interface;
303. third channel interface;
304. fourth channel interface;
305. USB interface;
306. charging interface;
307. power button.
400. coal face;
401. intake airway;
402. return airway;
403. intake airway coal or rock charge monitoring borehole;
404. return airway coal or rock charge monitoring borehole.

DETAILED DESCRIPTION

The specific implementation modes of embodiments of the present invention will now be described with reference to the drawings. It should be understood that the specific implementation modes described herein are merely for illustrating and explaining the embodiments of the present invention, and are not intended to limit the embodiments of the present invention.

It should be noted that "electrical connection" involved in the embodiments of the present invention is used to describe a signal connection between two components, such as circuit connection or signal line connection, and may be either a direct electrical connection between the two components or an indirect electrical connection by other components or circuits. In addition, "filtering unit" involved in the embodiments of the present invention may be a circuit formed by a plurality of elements or may be a single element having a filtering function. In addition, in the embodiments of the present invention, "data" and "signal" may be equivalently understood.

FIG. 1 is a structural schematic diagram of a coal or rock dynamic disaster warning apparatus according to an embodiment of the present invention. As shown in FIG. 1, the coal or rock dynamic disaster warning apparatus may include: at least one coal or rock charge probe 100 arranged adapting to a coal face and used for detecting charge data generated by coal or rock cracking in a coal mining process; and a monitoring host 200 electrically connected to the coal or rock charge probe 100 and used for acquiring the charge data and warning coal or rock dynamic disasters according to the charge data.

The at least one coal or rock charge probe 100, for example, includes a first coal or rock charge probe 100A, a second coal or rock charge probe 100B, a third coal or rock charge probe 100C and a fourth coal or rock charge probe 100D. In addition, the monitoring host 200 may be provided with a channel interface for the coal or rock charge probe 100, and the channel interface is used for electrically connecting the corresponding coal or rock charge probe 100 to the monitoring host 200. Each coal or rock charge probe corresponds to one channel interface, for example, a first channel interface 301, a second channel interface 302, a third channel interface 303, and a fourth channel interface 304 are used for plugging of the first coal or rock charge probe 100A, the second coal or rock charge probe 100B, the third coal or rock charge probe 100C, and the fourth coal or rock charge probe 100D respectively.

Figure 2:
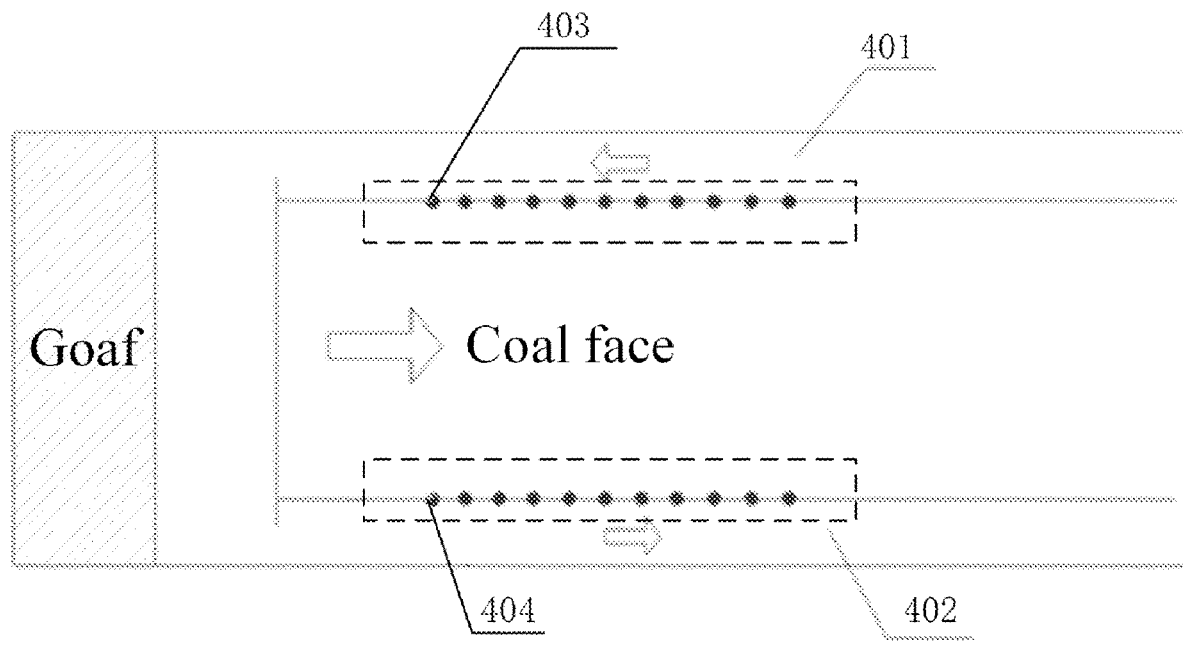
FIG. 2 is a field layout view of a coal or rock dynamic disaster warning apparatus according to an embodiment of the present invention.

Regarding the application of the above coal or rock dynamic disaster warning apparatus, for example, FIG. 2 is a field layout view of a coal or rock dynamic disaster warning apparatus according to an embodiment of the present invention, wherein an intake airway coal or rock charge monitoring borehole 403 and/or a return airway coal or rock charge monitoring borehole 404 are correspondingly formed in a range of 20 m to 50 m of an intake airway 401 and/or a return airway 402 of a coal face 400 away from a front coal face, and the boreholes are spaced by 3 m and have a depth of 1 m to 2 m. After removing excess coal slag in the boreholes, an operator places the coal or rock charge probe 100 at a location of 10 cm to 30 cm in the monitoring borehole, fixes the monitoring host 200, turns on a power switch, and observes coal or rock charge data and a variation curve thereof. In a first preferred embodiment, the quantity of the coal or rock charge probe is one, for example, the first coal or rock charge probe 100A is correspondingly installed at the intake airway coal or rock charge monitoring borehole 403 or the return airway coal or rock charge monitoring borehole 404. In this case, the monitoring host 200 used for warning coal or rock dynamic disasters according to the charge data includes: acquiring charge data detected in real time by the coal or rock charge probe, and indicating that a coal or rock dynamic disaster at a first risk level exists if an amplitude of the charge data exceeds a set amplitude; acquiring charge data detected by the coal or rock charge probe during a predetermined time period (for example, within 1 min), and indicating that a coal or rock dynamic disaster at a second risk level exists if a frequency that an amplitude of the charge data exceeds the set amplitude during the predetermined time period is greater than a set frequency; and/or acquiring charge data detected by the coal or rock charge probe during an adjacent specified period, and indicating that the coal or rock dynamic disaster at the first risk level exists if an amplitude of the charge data during a subsequent period is greater than a predetermined proportion an amplitude of the charge data during a previous period. The second risk level is higher than the first risk level.

It is to be noted that when a coal or rock dynamic disaster occurs, which is accompanied by coal or rock cracking, charges are generated in the coal or rock deforming and cracking process, causing a sharp rise or a sharp fluctuation in the amplitude of the charge data of the probe at a measuring point. Therefore, it is possible to know whether a coal or rock dynamic disaster occurs by judging whether the amplitude of the charge data detected in real time by the coal or rock charge probe exceeds the set amplitude. By way of example in combination with FIG. 2, when the amplitude of the coal or rock charge data exceeds 25 PC (PC is an amplitude unit), it is indicated that there is a danger of the coal or rock dynamic disaster; when the amplitude of the coal or rock charge data exceeds 25 PC and the occurrence frequency is 10 times/MIN, it is indicated that there is a greater danger of the coal or rock dynamic disaster, i.e., the risk level is higher; when the amplitude of the coal or rock charge data at the same location exceeds the amplitude of the monitored data in the previous day is greater than 30%, it is indicated that there is a danger of the coal or rock dynamic disaster.

In a second preferred embodiment, the quantity of the coal or rock charge probe is at least two, for example, the first coal or rock charge probe 100A, the second coal or rock charge probe 100B, the third coal or rock charge probe 100C, and the fourth coal or rock charge probe 100D are respectively installed in the intake airway coal or rock charge monitoring borehole 403 and the return airway coal or rock charge monitoring borehole 404. In this case, the monitoring host 200 used for warning coal or rock dynamic disaster according to the charge data includes: acquiring charge data detected in real time by the at least two coal or rock charge probes; indicating that a coal or rock dynamic disaster at a first risk level exists if an amplitude of the charge data for any one of the coal or rock charge probes exceeds the set amplitude; indicating that a coal or rock dynamic disaster at a second risk level exists if amplitudes of all the acquired charge data exceed the set amplitude; and determining a location of a damage source at which the coal or rock dynamic disaster occurs according to all the acquired charge data. The second risk level is higher than the first risk level.

By way of example in combination with FIG. 2, when the amplitude of any coal or rock charge data exceeds 25 PC, it is indicated that there is a danger of the coal or rock dynamic disaster; meanwhile, the first coal or rock charge probe 100A, the second coal or rock charge probe 100B, the third coal or rock charge probe 100C and the fourth coal or rock charge probe 100D are observed at the same time; and when the amplitudes of the charge data monitored by the four probes all exceed 25 PC, it is indicated that there is a greater danger of the coal or rock dynamic disaster. Further, the specific location of the damage source of the coal or rock dynamic disaster may be deduced from a relevant location formula by the charge data monitored by the first coal or rock charge probe 100A, the second coal or rock charge probe 100B, the third coal or rock charge probe 100C, and the fourth coal or rock charge probe 100D.

With respect to the location formula, for example, it is assumed that spatial coordinates of a main coal or rock cracking source is (x, y, z), a charge source generated by main cracking is q, spatial coordinates of the first coal or rock charge probe 100A are (0, 0, a), spatial coordinates of the second coal or rock charge probe 100B are (0, b, 0), spatial coordinates of the third coal or rock charge probe 100C are (c, 0, 0), and spatial coordinates of the fourth coal or rock charge probe 100D are (0, 0, 0), distances r1, r2, r3, r4 of the four sets of coal or rock charge probes from the main coal or rock cracking source can be expressed as:

$$r_1 = \sqrt{(x-0)^2 + (y-0)^2 + (z-a)^2} \quad (1)$$

$$r_2 = \sqrt{(x-0)^2 + (y-b)^2 + (z-0)^2} \quad (2)$$

$$r_3 = \sqrt{(x-c)^2 + (y-0)^2 + (z-0)^2} \quad (3)$$

$$\sqrt{r_4 = (x-0)^2 + (y-0)^2 + (z-0)^2} \quad (4)$$

The spatial coordinates of the main coal or rock cracking source can be calculated backwards as (x, y, z) according to these four formulas under the condition that the distances r1, r2, r3, r4 are known.

Figure 3:
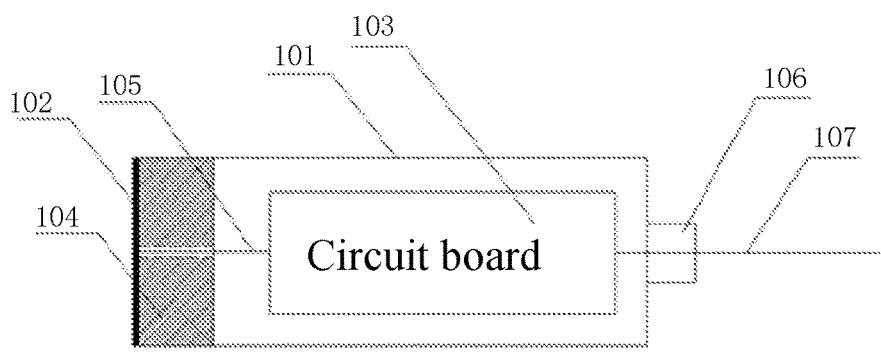
FIG. 3 is a structural schematic diagram of a coal or rock charge probe in a preferred embodiment of the present invention.

FIG. 3 is a structural schematic diagram of a coal or rock charge probe 100 in a preferred embodiment of the present invention. As shown in FIG. 3, the coal or rock charge probe 100 includes: a housing 101; an induction plate 102 disposed at one outer end of the housing and used for inducing charge data generated in a coal or rock cracking process; a circuit board 103 disposed in the housing 101, electrically connected to the induction plate 102 and the monitoring host 200, and used for performing signal processing on the charge data induced by the induction plate 102 and transmitting the charge data subjected to signal processing to the monitoring host 200; and an insulation plug 104, disposed between the induction plate and the housing and being in threaded connection with the housing 101, and used for establishing electrical insulation between the induction plate 102 and the housing 101.

The induction plate 102 may induce the charge generated in the coal or rock cracking process without directly contacting the coal or rock, for example a white steel induction plate or a pure copper induction plate are employed, such as a white steel disc of about 2 cm2 currently common in the market. Induction plates made of white steel or pure copper may well generate induced charges.

The circuit board 103 is, for example, a white steel circuit board that can be well shielded from external interference signals.

The induction plate 102 is electrically connected to the circuit board 103, for example, by a circuit connection line 105 passing through the insulation plug 104, and the insulation plug 104 establishes insulation between the induction plate 102 and the housing 101 so that there is no electric conduction between the induction plate 102 and the housing 101. In addition, the coal or rock charge probe 100 further includes a line exit bellmouth 106 and an output cable 107 that is electrically connected to the circuit board and connected from the line exit bellmouth 106, and the other end of the output cable 107 is connected to the monitoring host 200 to provide charge data to the monitoring host 200.

In a preferred embodiment, the circuit board 103 is integrated with a filtering unit for filtering the charge data induced by the induction plate 102.

Figure 4:
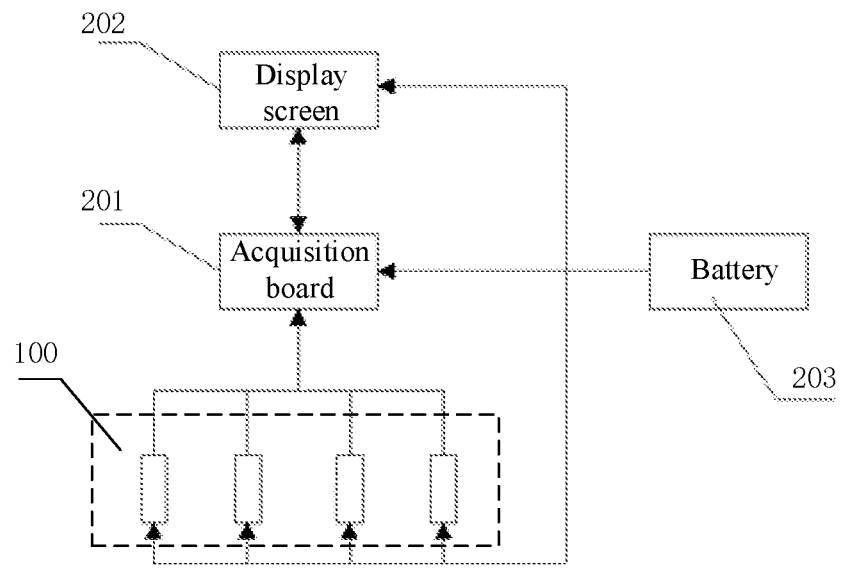
FIG. 4 is a structural schematic diagram of a monitoring host in a preferred embodiment of the present invention.

FIG. 4 is a structural schematic diagram of a monitoring host in a preferred embodiment of the present invention. As shown in FIG. 4, the monitoring host 200 may include: an acquisition board 201 electrically connected to the coal or rock charge probe 100 and used for acquiring the charge data; a display screen 202 used for acquiring the charge data and displaying the charge data from the acquisition board 201; and a battery 203 used for supplying power to the acquisition board 201 and the display screen 202, and used for supplying power to the coal or rock charge probe 100 through the acquisition board 201.

For example, the battery 203, which is, for example, an explosion-proof battery, supplies power to the display screen 202, the acquisition board 201 and each coal or rock charge probe 100 at the same time, so that the acquisition board 201 acquires the charge data output by each coal or rock charge probe 100 at the same time, also converts the charge data into 0-5 V voltage signals according to the linear law by performing charge conversion and outputs the voltage signals. The sampling frequency of the acquisition board 201 is, for example, 1 KHZ or above. The display screen 202 is electrically connected to the acquisition board 201 via RS485 communication to display the coal or rock charge data and a variation curve thereof.

Further, with reference to FIG. 1, the monitoring host 200 may also be configured with the above channel interfaces 301-304. Still further, the monitoring host 200 may also be configured with other interfaces, such as a USB interface 305 and a charging interface 306, wherein the USB interface 305 may be externally connected to other devices to enable data interaction between the monitoring host 200 and the other devices; the charging interface 306 may then be externally connected to a charging device to charge the monitoring host 200. In addition, the monitoring host 200 may also be configured with a power button 307 to control the startup and shutdown of the monitoring host 200.

Figure 5:
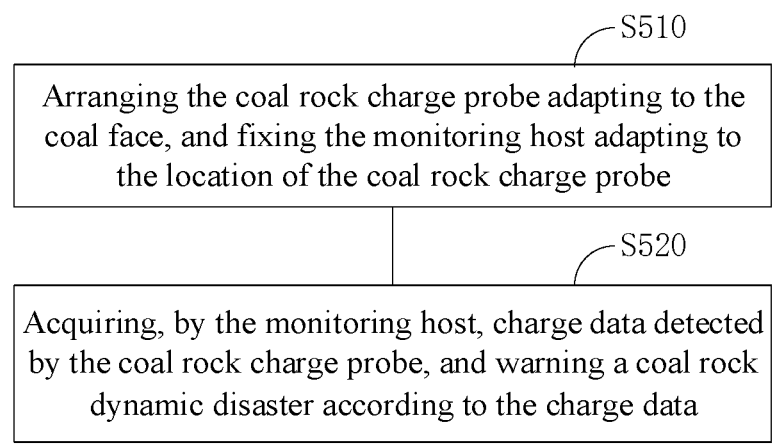
FIG. 5 is a flow chart of a coal or rock dynamic disaster warning method according to another embodiment of the present invention.

FIG. 5 is a flow chart of a coal or rock dynamic disaster warning method according to another embodiment of the present invention. The method uses the coal or rock dynamic disaster warning apparatus according to the above embodiment. As shown in FIG. 5, the method may include the following steps S510 and S520.

Step S510, arranging the coal or rock charge probes adapting to the coal face, and fixing the monitoring host adapting to the locations of the coal or rock charge probes.

In a preferred embodiment, the coal or rock charge probes are arranged adapting to the coal face, which may include: arranging boreholes for placement of the coal or rock charge probes within a specified distance range from the coal face within an intake airway and/or a return airway corresponding to the coal face, wherein each coal or rock charge probe is located within one corresponding borehole. Referring to FIG. 2, for example, intake airway coal or rock charge monitoring boreholes 403 and/or return airway coal or rock charge monitoring boreholes 404 are correspondingly arranged in a range of 20 meters to 50 meters of the intake airway 401 and/or the return airway 402 of the face coal distanced from the front coal face, and the boreholes are spaced by 3 m and have a depth of 1 m to 2 m; after the excess coal slag in the boreholes is removed, the operator places the coal or rock charge probe 100 at a location of 10 cm to 30 cm in the monitoring borehole, fixes the monitoring host 200, turns on the power switch, and observes coal or rock charge data and a variation curve thereof. The quantity of boreholes is identical to that of the coal or rock charge probes, one coal or rock charge probe is disposed in each borehole.

Step S520, acquiring, by the monitoring host, charge data detected by the coal or rock charge probes, and warning a coal or rock dynamic disaster according to the charge data.

For example, for the situation of detection by at least one coal or rock charge probe, the rock dynamic disasters are warned as follows:
  when the amplitude of the coal or rock charge data of any one of the probes exceeds 25 PC, it is indicated that there is a danger of a coal or rock dynamic disaster that is at a conventional risk level;
  when the amplitude of the coal or rock charge data of any one of the probes exceeds 25 PC and the occurrence frequency is 10 times/MIN, it is indicated that there is a greater danger of the coal or rock dynamic disaster, i.e., the risk level is higher;
  when the amplitude of the coal or rock charge data of the probe at the same location exceeds the amplitude of monitored data in the previous day is greater than 30%, it is indicated that there is a danger of the coal or rock dynamic disaster that is at the conventional risk level; and
  when the amplitudes of the charge data monitored by the plurality of probes all exceed 25 PC, it is indicated that there is a greater danger of the coal or rock dynamic disaster, i.e., the risk level is higher; and under this situation, according to the charge data monitored by the plurality of probes, the specific location of the damage source of the coal or rock dynamic disaster can be deduced from the relative location formula.

In summary, the coal or rock dynamic disaster warning apparatus and method according to the embodiments of the present invention have the following advantages.

First, the multi-channel, non-manual contact and portable coal or rock dynamic disaster warning apparatus is provided. The advantages of "multi-channel" are that it is possible to install one coal or rock charge probe, and it is also possible to install a plurality of coal or rock charge probes; signal channels for the respective coal or rock charge probes to transmit charge data to the monitoring host are separated from each other, avoiding signal interference and facilitating simultaneous single-point dynamic disaster warning analysis and multiple-point dynamic disaster comprehensive warning analysis by the monitoring host. The advantages of "non-manual contact" are that an employee does not need to directly contact the coal face, and only needs to observe the display data of the monitoring host at a safe location, thereby helping to ensure the safety of the employee. The advantages of "portable" are that according to the coal or rock dynamic disaster warning apparatus of the embodiment of the present invention, the structure is simple, and the monitoring host is an easily movable device with portability, so that it is easy for the employee to change the location of the monitoring host to be adapted to the field situation after arranging the coal or rock charge probe.

Second, the entirely new coal or rock dynamic disaster warning method is provided, which utilizes the coal or rock dynamic disaster warning apparatus of the embodiment of the present invention, achieves the real-time, accurate and localized warning of coal or rock dynamic disasters based on the safe, efficient, intelligent principle, solves various problems of poor timeliness, high cost, difficult construction of warning solutions, high false warning rate, presence of false negatives, and incapability of location of warning of the coal or rock dynamic disasters, and improves not only the warning efficiency of the coal or rock dynamic disasters, but also the warning accuracy of the coal or rock dynamic disasters.

Those skilled in the art should understand that, the embodiments of the present application may be provided as a method, a system, or a computer program product. Accordingly, the present application may take the form of an entirely hardware embodiment, an entirely software embodiment or an embodiment combining software and hardware aspects. Furthermore, the present application may take the form of a computer program product implemented on one or more computer usable storage media (including but not limited to a disk memory, CD-ROM, an optical memory, etc.) containing computer usable program codes.

The present application is described with reference to the flow charts and/or block diagrams of the methods, apparatus (systems), and computer program products according to the embodiments of the application. It should be understood that each flow and/or block in the flow charts and/or block diagrams, and combinations of flows and/or blocks in the flow charts and/or block diagrams can be implemented by computer program instructions. These computer program instructions may be provided to a processor of a general-purpose computer, a special-purpose computer, an embedded processor, or other programmable data processing devices to produce a machine, such that the instructions, which are executed by the processor of the computer or other programmable data processing devices, produce a device for implementing the functions specified in one or more flows in the flow charts or one or more blocks in the block diagrams.

These computer program instructions may also be stored in a computer-readable memory that can direct the computer or other programmable data processing devices to operate in a particular manner, such that the instructions stored in the computer-readable memory produce an article of manufacture including instruction devices which implement the functions specified in one or more flows in the flow charts or one or more blocks in the block diagrams.

These computer program instructions may also be loaded onto the computer or other programmable data processing devices, such that a series of operational steps are performed on the computer or other programmable devices to produce a computer-implemented process, and thus, the instructions which are executed on the computer or other programmable devices provide steps for implementing the functions specified in one or more flows in the flow charts or one or more blocks in the block diagrams.

In one typical configuration, a computing device includes one or more central processing units (CPU), an input/output interface, a network interface, and a memory.

The memory may include forms of a volatile memory, a random access memory (RAM), and/or a non-volatile memory such as a read-only memory (ROM) or flash RAM in a computer-readable medium. The memory is an example of the computer-readable medium.

The computer-readable medium includes volatile and non-volatile, removable and non-removable media and may be implemented in any method or technology for storage of information. The information may be computer-readable instructions, data structures, program modules, or other data. Examples of the storage medium of the computer include, but are not limited to phase-change memory (PRAM), a static random access memory (SRAM), a dynamic random access memory (DRAM), other types of random access memory (RAM), read-only memory (ROM), electrically erasable programmable read-only memory (EEPROM), flash memory or other memory technologies, a compact disc read-only memory (CD-ROM), a digital versatile disk (DVD) or other optical storage, magnetic cassette, magnetic tape storage, magnetic disk storage or other magnetic storage devices, or any other non-transmission media and may be used to store information that may be accessed by the computing device. As defined herein, the computer-readable medium does not include transitory media, such as modulated data signals and carrier waves.

It also should be noted that, the terms "comprise," "include," or any other variations thereof, are intended to cover a non-exclusive inclusion, such that a process, method, article of manufacture, or device that includes a list of elements does not include only those elements but may include other elements not expressly listed or inherent to such process, method, article of manufacture, or device. An element defined by the phrase "include a . . . " does not, without more constraints, preclude the existence of additional identical elements in the process, method, article of manufacture, or device that includes the element.

The above are only embodiments of the present application, and are not used to limit the present application. Various modifications and variations of the present application will occur to those skilled in the art. Any modifications, equivalents, improvements, and the like within the spirit and principles of the present application are included within the scope of the claims of the present application.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

What is claimed is:

1. A coal or rock dynamic disaster warning apparatus comprising:
   at least one coal or rock charge probe configured for detecting charge data of a coal or rock face generated by coal or rock cracking in a mining process; and
   a monitoring host, electrically connected to each of the coal or rock charge probes and configured to receive the charge data from the coal or rock charge probes and to issue a coal or rock dynamic disaster warning according to the charge data;
   wherein the coal or rock charge probe comprises:
      a housing;
      an induction plate disposed at an outer end of the housing and configured to detect charge data generated by a coal or rock cracking process;
      a circuit board, disposed inside the housing, electrically connected to the induction plate and the monitoring host, and configured to perform signal processing on the charge data detected by the induction plate and to transmit the signal processed charge data to the monitoring host; and
      an insulation plug, disposed between the induction plate and the housing, and configured to establish electrical insulation between the induction plate and the housing.

2. The coal or rock dynamic disaster warning apparatus of claim 1, wherein a quantity of the coal or rock charge probes is one, and wherein the monitoring host is configured to execute at least one of the following steps to issue the coal or rock dynamic disaster warning according to the charge data:
   acquire charge data detected in real time by the coal or rock charge probe, and indicate that a coal or rock dynamic disaster at a first risk level exists if an amplitude of the charge data exceeds a specified amplitude;
   acquire charge data detected by the coal or rock charge probe during a predetermined time period, and indicate that a coal or rock dynamic disaster at a second risk level exists if a frequency at which an amplitude of the charge data exceeds the set amplitude during the predetermined time period is greater than a specified frequency; and
   acquire charge data detected by the coal or rock charge probe during adjacent first and second periods, indicate that a coal or rock dynamic disaster at the first risk level exists if an amplitude of the charge data during the second period is greater by a specified proportion than an amplitude of the charge data during the first period;
   the second risk level being higher than the first risk level.

3. The coal or rock dynamic disaster warning apparatus of claim 1, wherein a quantity of the coal or rock charge probes is at least two, and the monitoring host is configured to execute the following steps to issue the coal or rock dynamic disaster warning according to the charge data:
   acquire charge data detected in real time by the at least two coal or rock charge probes;
   indicate that a coal or rock dynamic disaster at a first risk level exists if an amplitude of the charge data for any one of the coal or rock charge probes exceeds a specified amplitude;
   indicate that a coal or rock dynamic disaster at a second risk level exists if amplitudes of all of the acquired charge data exceed the specified amplitude; and
   determine a location of a damage source at which the coal or rock dynamic disaster occurs according to the acquired charge data;
   the second risk level being higher than the first risk level.

4. The coal or rock dynamic disaster warning apparatus of claim 1, wherein the induction plate is a white steel induction plate or a pure copper induction plate.

5. The coal or rock dynamic disaster warning apparatus of claim 1, wherein the circuit board is a white steel circuit board.

6. The coal or rock dynamic disaster warning apparatus according to claim 1, wherein the circuit board is integrated with a filtering unit configured to filter the charge data detected by the induction plate.

7. The coal or rock dynamic disaster warning apparatus of claim 1, wherein the monitoring host comprises:
   an acquisition board electrically connected to the coal or rock charge probe and configured to receive the charge data therefrom;
   a display screen configured to receive the charge data from the acquisition board and to display the charge data; and
   a battery configured to supply power to the acquisition board and to the display screen, and also to supply power to the coal or rock charge probe via the acquisition board.

8. The coal or rock dynamic disaster warning apparatus of claim 7, wherein the monitoring host further comprises, for each of the coal or rock charge probes, a channel interface cooperative with the coal or rock charge probe and configured to electrically connect the coal or rock charge probe to the acquisition board.

9. A coal or rock dynamic disaster warning method, comprising:
   providing a coal or rock dynamic disaster warning apparatus comprising at least one coal or rock charge probe and a monitoring host, wherein each of the coal or rock charge probes comprises:
      a housing;
      an induction plate disposed at an outer end of the housing and configured to detect charge data generated by a coal or rock cracking process;
      a circuit board, disposed inside the housing, electrically connected to the induction plate and the monitoring host, and configured to perform signal processing on the charge data detected by the induction plate and to transmit the signal processed charge data to the monitoring host; and
      an insulation plug disposed between the induction plate and the housing, and configured to establish electrical insulation between the induction plate and the housing;
   adapting the coal or rock charge probe to a coal or rock face;
   connecting the monitoring host to the coal or rock charge probe;
   acquiring, by the monitoring host, charge data detected by the coal or rock charge probe; and
   issuing a warning of a coal or rock dynamic disaster when indicated by the charge data.

10. The coal or rock dynamic disaster warning method of claim 9, wherein adapting the coal or rock charge probe to the coal or rock face comprises:

for each of the coal or rock charge probes, providing a borehole suitable for placement therein of the coal or rock charge probe at a location inside of an intake airway or a return airway of the coal face and within a specified distance range from the coal face, wherein a separate borehole is provided for each of the coal or rock charge probes.

11. The coal or rock dynamic disaster warning method of claim 9, wherein a quantity of the coal or rock charge probes is one, and wherein issuing a warning of a coal or rock dynamic disaster when indicated by the charge data comprises at least one of:

acquiring charge data detected in real time by the coal or rock charge probe, and indicating that a coal or rock dynamic disaster at a first risk level exists if an amplitude of the charge data exceeds a specified amplitude;

acquiring charge data detected by the coal or rock charge probe during a predetermined time period, and indicating that a coal or rock dynamic disaster at a second risk level exists if a frequency at which an amplitude of the charge data exceeds the specified amplitude during the predetermined time period is greater than a specified frequency; and acquiring charge data detected by the coal or rock charge probe during adjacent first and second periods, and indicating that a coal or rock dynamic disaster at the first risk level exists if an amplitude of the charge data during the second period is greater by a specified proportion than an amplitude of the charge data during the first period;

the second risk level being higher than the first risk level.

12. The coal or rock dynamic disaster warning method of claim 9, wherein a quantity of the coal or rock charge probes is at least two, and wherein issuing a warning of a coal or rock dynamic disaster when indicated by the charge data comprises:

acquiring charge data detected in real time by the at least two coal or rock charge probes;

indicating that a coal or rock dynamic disaster at a first risk level exists if an amplitude of the charge data for any one of the coal or rock charge probes exceeds a specified amplitude;

indicating that a coal or rock dynamic disaster at a second risk level exists if amplitudes of the charge data detected by all of the coal or rock charge probes exceed the specified amplitude; and determining a location of a damage source at which the coal or rock dynamic disaster occurs according to the acquired charge data;

the second risk level being higher than the first risk level.

13. The coal or rock dynamic disaster warning method of claim 9, wherein the induction plate is a white steel induction plate or a pure copper induction plate.

14. The coal or rock dynamic disaster warning method of claim 9, wherein the circuit board is a white steel circuit board.

15. The coal or rock dynamic disaster warning method of claim 9, wherein the circuit board is integrated with a filtering unit configured to filter the charge data detected by the induction plate.

16. The coal or rock dynamic disaster warning method of claim 9, wherein the monitoring host comprises:

an acquisition board electrically connected to the coal or rock charge probe and configured to receive the charge data therefrom;

a display screen configured to receive the charge data from the acquisition board and display the charge data; and a battery configured to supply power to the acquisition board and to the display screen, and also to supply power to the coal or rock charge probe via the acquisition board.

17. The coal or rock dynamic disaster warning method of claim 15, wherein the monitoring host further comprises, for each of the coal or rock charge probes, a channel interface cooperative with the coal or rock charge probe and configured to electrically connect the coal or rock charge probe to the acquisition board.

\* \* \* \* \*